United States Patent Office 3,702,731
Patented Nov. 14, 1972

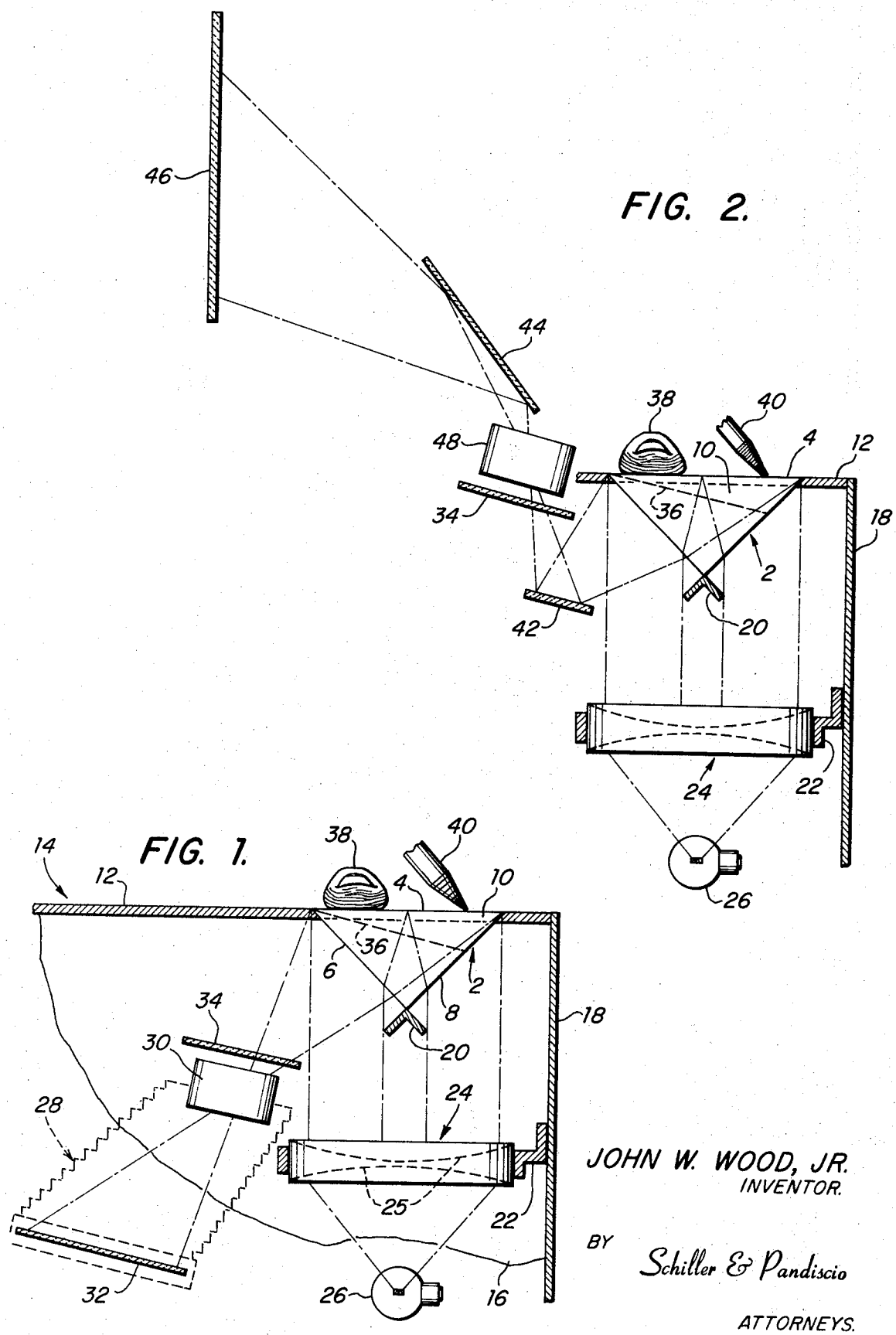

3,702,731
APPARATUS FOR RECORDING OR VIEWING
SKIN RIDGE PATTERNS
John W. Wood, Jr., Newton, Mass., assignor to
Group 128, Incorporated
Filed July 21, 1970, Ser. No. 56,934
Int. Cl. G03b 27/16
U.S. Cl. 355—18                    14 Claims

ABSTRACT OF THE DISCLOSURE

Apparatus for recording or viewing fingerprints comprising a prism, a light source for illuminating the prism, and means focused so as to provide images for recording or viewing purposes of the prints of fingers placed into optical contact with a surface of the prism.

---

This invention relates to optical apparatus and more particularly to a novel method and optical apparatus for recording and/or viewing fingerprints and other skin ridge patterns and also writings.

A variety of devices are known for optically recording fingerprints and a number use the principle of frustrated internal reflection in a prism to produce images of skin ridge patterns placed in optical contact with a surface of the prism. Illustrative of the prior art are U.S. Pats. 3,478,658, 3,422,446, 3,231,861, 3,200,701, 3,174,414, and 2,195,699. U.S. Pat. 3,478,658 shows a device that is adapted to record rolled fingerprints as well as multiple fingerprints on a single sheet of film. However, while prior devices of the type described make it possible to achieve photographic images of skin ridge patterns, they suffer from certain disadvantages, notably, uneven illumination of the prism surface against which the skin area to be photographed is pressed, excessive space requirements due to the disposition of the illuminating source and needed lens elements, poor image contrast due to exposure of the camera lens to light rays reflected from areas of the aforesaid prism surface that are not engaged by a skin area, and relatively long exposure time due to low level illumination of the prism.

Accordingly, the primary object of this invention is to improve upon prior optical devices for recording and/or viewing fingerprints and other skin ridge patterns.

A more specific object is to provide a system for recording fingerprints and the like that has the same advantages but is substantially free of the limitations of the prior art mentioned hereinabove.

A further object is to provide an improved system for photographically recording or projecting on a viewing screen images of skin ridge patterns and the like, the system being endowed with the following advantages of the conventional ink pad method of recording fingerprints: excellent contrast of skin ridges and the valleys between ridges, ability to record rolled fingerprints as well as palm prints, and capability of recording multiple fingerprints one at a time on a single frame of film without need for advancing film or closing the camera shutter between successive recordings. On the other hand, the system is free of the disadvantages of the ink pad method, particularly the drawbacks of smudging and application of ink to skin areas.

The foregoing and other objects hereinafter described or rendered obvious are achieved by apparatus that includes a transparent body, a light source, and an imaging lens system (with or without shutter) combined in a manner different than shown in the prior art. Specifically, the transparent body is a multifaceted prism and the light source is employed so as to direct light rays through the prism to a first face thereof with little or none of the light rays being reflected when no skin area is in optical contact with said face. Adjacent to a second face of the prism is a dark, light absorbing means which provides a dark viewing background and also dissipates any reflected light rays incident thereto. The lens system is focused through a third face of the prism at all or a selected part of the area of the first face and is disposed at an angle greater than the critical angle so that when not blocked by a shutter it will not look through the first face and hence will normally see black due to the dark light absorbing means present at the second face. When a skin area is brought into optical contact with the first surface and illuminated by the light source, light rays touching the ridges of the skin will be scattered and reflected back through the lens system, while light rays illuminating the valleys or grooves of the skin will be reflected back to the light source or absorbed by the skin or reflected back at an angle such as not to be seen by the lens. Since the lens system does not see any light until something is brought into optical contact with an area of the first face of the prism on which it is focused, it is possible to record without blocking the lens system the prints of several fingers on one frame of film, regardless of whether the fingers are brought into optical contact simultaneously or serially; it is also possible to record a rolled fingerprint. Means are also included for assuring uniform image intensity and the system may be adapted to function as a screen projector. Other features of the invention are set forth in the following detailed description which is to be considered together with the accompanying drawings wherein:

FIG. 1 schematically illustrates a preferred embodiment of the invention designed to photographically record finger, palm, and/or foot or paw prints and also writings made on the prism; and FIG. 2 illustrates a modification of the invention adapted to project images on a screen.

Referring now to FIG. 1, the illustrated apparatus comprises a transparent right angle prism 2 having a hypotenuse face 4 and opposite angularly disposed faces 6 and 8 plus two opposite end faces, one of which is shown at 10. The end faces extend in parallel planes that intersect the faces 4, 6, and 8 at right angles. The prism is mounted in the top wall 12 of a box-like housing 14. Although only portions of the top wall and two of its side walls 16 and 18 are shown, it is to be understood that the housing completely encloses the system so that only the top surface of the prism is exposed. Attached to the prism at the apex formed by its side faces 6 and 8 is light-blocking member 20 which in the illustrated embodiment is a V-shaped channel member made and disposed so that its sides extend laterally of the apex by the same amount. Mounted below the prism in a supporting frame 22 attached to the housing 14 is a condenser lens system 24 of conventional design. By way of example, lens system 24 may be a pair of plano-convex lenses 25 or a pair of plastic fresnel lenses with a combined focal length of five inches or a lantern slide projector lens. The lens system is mounted so that its center axis extends through the apex of the prism. Located below the lens system 22 one focal length away is a light source which may be an incandescent bulb 26. Although not shown it is to be understood that the light source is mounted in a suitable holder attached to the housing and also that it may be surrounded by a shield or reflector for directing the light at the lens system 22. The condenser lens system is disposed so as to substantially collimate light from the light source and to direct the light so that it will illuminate the prism faces 6 and 8.

At least the inner surface of housing wall 18 located next to the prism face 8 and preferably all of the inner surfaces of the housing have a flat black finish so as to dissipate or absorb any light rays impinging therein. The flat black finish may be achieved by painting or preferably by coating the wall surface with a fibrous flock. It is to be noted also that a separate light absorbing panel may be installed between housing wall 18 and the prism if the housing is so constructed that an appreciable depth of space exists between the prism and the wall.

Also mounted in the enclosure by suitable means (not shown) so that the prism 2 is disposed between it and the housing wall 18 is a conventional camera 28 which includes an objective lens 30 and a conventional push button or lever operated shutter mechanism (not shown), plus means (also not shown) for supporting a sheet of photographic film in a film plane 32. The objective lens preferably is a wide angle lens (e.g. a six inch focal length Metrogon lens) whereby the fingerprints on the prims hypotenuse are imaged onto the film plane without keystone effect. Mounted between the lens 30 and the face 6 of the prism on suitable support means (not shown) is an optical filter 34 characterized by maximum light transmission at its periphery and minimum light transmission in the center. The filter may be produced in various ways as, for example, by evaporation deposition of a metal or metal alloy with the thickness of deposition varying across the plate according to a predetermined mathematical function such that the filter will normalize the illumination seen by the lens. It is to be noted that the function of filter 34 is to compensate for the well-known property of a photographic objective to exhibit a decrease in illumination off the optical axis which follows a $\cos^4 \theta$ function according to the equation $$E'' = B'w' \cos^4 \theta$$

where $E''$ is illuminance at a point off the axis; $w'$ is the angle subtended by the exit pupil of the lens; $\theta$ is the half-field angle; and $B'$ is the brightness of the exit pupil. If the taper in illumination by the lens is not compensated for by a filter 34 as above described, fingerprints on the left side of the prism as seen in FIG. 1 will appear brighter compared with those on the right side. The illustmination change or gradient seen by the lens, if not compensated by a filter as herein contemplated, can be large enough to exceed the range of the film used and as a result over- or under-exposed fingerprint photographs may be produced (typically, for example, photographs of fingerprints on the right side of the prism hypotenuse will be washed out while those on the left side will be properly exposed). Use of the compensating filter overcomes this problem. It is to be realized that the filter could be positioned at other locations in the optical path. Thus, for example, it may be positioned on one surface of the condenser lens system or on the prism face 6.

The objective lens system 30 is positioned at an angle greater than the critical angle of incidence of hypotenuse face 4 so as to focus the reflected images of fingerprints onto the film plane. In this connection it to be noted that the images of fingerprints on the prism hypotenuse appear at an apparent angle illustrated by the dashed line 36 due to the refractive index of the prism being greater than air. The angle at which the image is tilted will depend on the refractive index of the prism. Thus for a prism having a refractive index of 1.52, the angle of image tilt is about 11 degrees relative to the prism hypotenuse. To overcome keystoning because of this angle of tilt, the film plane 32 is located parallel to and the optical axis of lens 30 is perpendicular to the apparent plane of the reflected image.

Operation of the device described above is as follows: Light from source 26 is collimated by the condenser lens system and enters the prism via both of the faces 6 and 8. The light entering the prism is refracted toward the center of the prism hypotenuse. Without light block 20 the light rays would overlap in the central area of the hypotenuse face so that the central area would receive substantially greater illumination than those areas of the hypotenuse face near the faces 6 and 8. The light block prevents such overlap. The condenser lens system, which concentrates the light on the prism, and the light block together provide even high intensity illumination over the hypotenuse face of the prism with substantially all of the light received by the hypotenuse face passing directly through it since the light rays impinge thereon at less than the critical angle. As a result objective lens 30 normally will see only the black surface of housing wall 18. However, if now a finger is pressed against the hypotenuse face 4 as shown at 38 so as to make contact with that face, light striking that area of the face which is contacted by the finger will be scattered according to the skin ridge pattern. Some of this scattered light comes back at greater than the critical angle and provides an image of the skin ridge pattern that is seen by the objective lens 30 which focuses it onto the photographic film located in the film plane 32. That light which passes into the valleys or grooves of the skin of the finger is not seen by lens 30 since it is either absorbed by the skin or is reflected back down to the light source or is reflected back at an angle less than the critical angle. The light coming back to the objective lens 30 passes first through filter 34 which attenuates the light intensity of the reflected image of the skin ridge pattern so as to normalize it. Since the housing wall is black, the reflected image is characterized by sharp contrast between the ridges and valleys of the fingerprint. In other words the reflected image of the skin ridge pattern of the finger is white against a black background. When the image recorded on black and white film is developed, the skin ridges will be dark and the valleys will be light.

It is to be noted that the optical contact of the finger with the prism may be enhanced by slight moistening of the skin with water or a light oil such as a baby oil.

It is to be noted also that because no light passes from source 26 to the objective lens 30, it is not necessary to have a shutter mechanism in order to prevent exposure of the film when no print is to be recorded, particularly if a slow speed film is used and the light source is not activated except when a print is to be recorded. However, in practice it is preferred to have a shutter mechanism and to open it only when a print is to be recorded, in which case the light source may be kept on between prints or activated only when required.

As indicated above, rolled fingerprints can be recorded. Also the device may be used to record prints of several fingers without need for advancing the film. In this connection it is to be remembered that the camera sees only what is in optical contact with the prism. Hence by keeping the shutter open or opening it for each print as desired, it is possible to press different fingers one at a time against different areas of the hypotenuse face to successively expose different areas of the photographic film with the result that the developed film will have recorded therein negative images of the several fingers with the images spaced according to where the fingers were placed on the hypotenuse face of the prism. It also is contemplated that provision may be made for activating the light source in synchronism with operation of the shutter mechanism.

A further feature of the system just described is that identifying data such as the person's name and social security number may be recorded on the same frame of film as are the person's fingerprints. This may be done by writing the identifying data on the hypotenuse face with a grease pencil as shown at 40 and then photographing the data. The grease applied to the prism will scatter light the same as the skin ridges of a finger. Since the lens 30 sees the reverse image of the written data but then reverses it again in focusing it on the film at film plane 32, the recorded image will be as written except that when the film is developed the writing will appear dark against a light background.

The optical arrangement shown in FIG. 1 may be modified so as to permit images of skin ridge patterns or writings to be projected onto a projection screen or a ground glass. One possible modification is shown in FIG. 2.

Referring now to FIG. 2, the illustrated system includes all of the elements shown in FIG. 1 except the camera 28 (it is to be noted that these elements common to FIGS. 1 and 2 are identified by the same numerals). The system of FIG. 2 additionally includes two mirrors 42 and 44 for folding the optical path and reversing the image side to side so that a normal image may be projected onto a conventional projection screen 46, plus a conventional projection lens 48 adapted to enlarge the image to a size convenient for viewing on the screen. Mirror 42 is disposed so that it extends parallel to the apparent plane 36 of the reflected image, while lens 48 is disposed with its optical axis extending at a right angle to the same plane. The filter 34 is preferably disposed between mirror 42 and projector lens 48. As an alternative measure, screen 46 may be replaced by a ground glass. It is to be noted that if a ground glass is used in place of screen 46, use of a projection lens 48 may or may not be required depending upon the size of the image desired to be displayed on the ground glass. Although not shown, it is to be understood that the several elements shown in FIG. 2 (except for screen 46) are mounted in a housing so that only the mirror 44 and the hypotenuse face of the prism are exposed to view. It also is to be understood that the projection system may be other than as shown in FIG. 2. Thus for example, if it is not necessary to achieve image reversal side to side so that a normal image is seen, it is possible to eliminate mirror 44 and replace it with a ground glass.

It also is contemplated that different light sources may be used according to the type of film being used and hence even infra-red light may be employed.

Still other modifications will be obvious to persons skilled in the art according to different space and use requirements.

What is claimed is:

1. Apparatus for providing an image of an object comprising, a prism bounded in part by first, second and third planar faces, said first face disposed so that the object to be imaged can be placed in optical contact therewith and said second and third faces disposed in angular relation to said first face so that they converge on each other with increasing distance from said first face;

a light source for illuminating said prism, said light source being adapted to direct light rays at both said second and third faces so that said light rays will pass through said second and third faces and impinge on said first face at an angle not exceeding the critical angle of incidence, whereby substantially all of said impinging light rays normally pass through said first face; and imaging means for forming an image of an object placed in optical contact with said first face, said imaging means comprising means disposed on the same side of said prism as one of said second and third faces for receiving light rays that as a result of said optical contact are reflected by said first face at an angle greater than said critical angle and pass out of said prism via said one face.

2. Apparatus according to claim 1 wherein said imaging means comprises an objective mounted so that its optical axis is disposed at an angle greater than said critical angle relative to said first face.

3. Apparatus according to claim 2 wherein as viewed through said one face the image of said object appears to be in a plane within said prism that is canted relative to said first face, and further wherein said objective is disposed so that its optical axis is perpendicular to said plane.

4. Apparatus according to claim 1 wherein said imaging means is a camera having a lens focused through said one face on an area of said first face.

5. Apparatus according to claim 1 further including means interposed between said light source and said prism for causing said first face to be illuminated evenly across a predetermined portion of its area.

6. Apparatus according to claim 1 wherein said imaging means comprises an objective, and further including optical filter means interposed in the light path between said light source and said objective for reducing gradients in the illumination seen by said objective.

7. Apparatus according to claim 1 comprising a condenser lens system for collimating the light passing from said source to said prism.

8. Apparatus according to claim 1 further including dark light-absorbing background means for absorbing light rays reflected to the other of said first and second faces by way of said first face.

9. Apparatus according to claim 1 wherein said imaging means comprises a projecting lens for projecting said image onto a viewing surface.

10. Apparatus according to claim 1 wherein as viewed through said one face the image of said object appears to be in a plane within said prism that is canted relative to said first face, and further wherein said imaging means comprises a planar mirror disposed so that it is parallel to said canted plane.

11. Apparatus for providing an image of an object comprising, a prism bounded in part by first, second and third planar faces, said first face disposed so that the object to be imaged can be placed in optical contact therewith and said second and third faces converging on each other at an angle of 90 degrees and extending at angles of 45 degrees with respect to said first face;

a light source for illuminating said prism, said light source being mounted to direct light rays at both of said second and third faces converging on each other will pass through said second and third faces and impinge on said first face at an angle not exceeding the critical angle of incidence whereby most of said light rays will normally pass through said first face;

light blocking means positioned adjacent said second and third faces for blocking passage of light from said source into said prism through selected areas of said second and third faces adjacent the line of intersection of the planes of said second and third faces;

light absorbing means for absorbing any light rays reflected from said first face to said third face; and imaging means for forming an image of an object in optical contact with said first face, said imaging means being disposed on the same side of said prism as said second face and being adapted to receive light rays that as a result of said optical contact are reflected by said first face at an angle greater than said critical angle and pass out of said prism via said second face.

12. Apparatus for providing an image of an object, comprising:

a prism bounded in part by first, second and third planar faces, said first face disposed so that the object to be imaged can be placed in optical contact therewith and said second and third faces disposed at 45 degrees angles to said first face and converging on each other at a right angle;

a light source for illuminating said prism, said light source being adapted to direct light rays at both said second and third faces so that said light rays will pass through said second and third faces and impinge on said first face at an angle not exceeding the critical angle of incidence, whereby substantially all of said impinging light rays normally pass through said first face;

means disposed to block passage of light into said prism through selected areas of said second and third faces adjacent the line of intersection of the planes of said second and third faces; and imaging means for forming an image of an object placed in optical contact with said first face, said imaging means comprising means disposed on the same side of said prism as one of said second and third faces for receiving light rays that as a result of said optical contact are reflected by said first face at an angle greater than said critical angle and pass out of said prism via said one face.

13. Apparatus according to claim 1 wherein said imaging means comprises means for photographically recording said image.

14. Apparatus according to claim 1 further including optical filter means for reducing gradients in the illumination received by said imaging means.

References Cited

UNITED STATES PATENTS

| | | | |
|---|---|---|---|
| 3,174,414 | 3/1965 | Myer | 95—1.1 |
| 3,478,658 | 11/1969 | Hu | 355—40 X |
| 3,422,446 | 1/1969 | Riggles | 95—1.1 |
| 3,407,715 | 10/1968 | McCutchen | 95—1.1 |

JOHN M. HORAN, Primary Examiner

U.S. Cl. X.R.

95—1.1; 355—40

UNITED STATES PATENT OFFICE
CERTIFICATE OF CORRECTION

Patent No. 3,702,731          Dated November 14, 1972

Inventor(s) John W. Wood, Jr.

It is certified that error appears in the above-identified patent and that said Letters Patent are hereby corrected as shown below:

Column 6, Line 42, claim 11, delete "converging on each other" and insert --so that said light rays--;

and

Column 6, Line 67, claim 12, change "degrees" to --degree--.

Signed and sealed on this 24th day of April 1973.

(SEAL)
Attest:

EDWARD M. FLETCHER, JR.        ROBERT GOTTSCHALK
Attesting Officer                Commissioner of Patents